United States Patent
Cisneros, Jr. et al.

(10) Patent No.: US 11,791,057 B2
(45) Date of Patent: Oct. 17, 2023

(54) REFLECTORS FOR MOLTEN CHLORIDE FAST REACTORS

(71) Applicant: TerraPower, LLC, Bellevue, WA (US)

(72) Inventors: Anselmo T. Cisneros, Jr., Seattle, WA (US); Charles Gregory Freeman, Tampa Bay, FL (US); Kevin Kramer, Redmond, WA (US); Jeffery F. Latkowski, Mercer Island, WA (US)

(73) Assignee: TerraPower, LLC, Bellevue, WA (US)

(*) Notice: Subject to any disclaimer, the term of this patent is extended or adjusted under 35 U.S.C. 154(b) by 0 days.

(21) Appl. No.: 17/368,576

(22) Filed: Jul. 6, 2021

(65) Prior Publication Data
US 2021/0343431 A1  Nov. 4, 2021

Related U.S. Application Data

(63) Continuation of application No. 16/299,783, filed on Mar. 12, 2019, now Pat. No. 11,075,015.
(Continued)

(51) Int. Cl.
*G21C 11/06* (2006.01)
*G21C 1/02* (2006.01)
(Continued)

(52) U.S. Cl.
CPC .............. *G21C 11/06* (2013.01); *G21C 1/022* (2013.01); *G21C 15/10* (2013.01); *G21C 3/22* (2013.01); *G21C 3/54* (2013.01); *G21C 7/28* (2013.01)

(58) Field of Classification Search
CPC . G21C 1/022; G21C 1/22; G21C 5/10; G21C 11/06; G21C 15/10; G21C 1/03; G21C 5/126; G21C 5/14; G21C 15/26
(Continued)

(56) References Cited

U.S. PATENT DOCUMENTS 2,375,009 A    5/1945  Lepsoe et al.
2,852,456 A *  9/1958  Wade ..................... G21C 7/27
                                                  376/334
(Continued)

FOREIGN PATENT DOCUMENTS

CA      631890      11/1961
CN     1150310       5/1997
(Continued)

OTHER PUBLICATIONS

Renault, Claude et al. "The Molten Salt Reactor (MSR) R&D Status and Perspectives in Europe." (2010) (Year: 2010).*
(Continued)

*Primary Examiner* — Jack W Keith
*Assistant Examiner* — Jinney Kil
(74) *Attorney, Agent, or Firm* — Merchant & Gould P.C.

(57) ABSTRACT

A reflector assembly for a molten chloride fast reactor (MCFR) includes a support structure with a substantially cylindrical base plate, a substantially cylindrical top plate, and a plurality of circumferentially spaced ribs extending between the base plate and the top plate. The support structure is configured to encapsulate a reactor core for containing nuclear fuel. The MCFR also includes a plurality of tube members disposed within the support structure and extending axially between the top plate and the bottom plate. The plurality of tube members are configured to hold at least one reflector material to reflect fission born neutrons back to a center of the reactor core.

16 Claims, 11 Drawing Sheets

Related U.S. Application Data

(60) Provisional application No. 62/641,756, filed on Mar. 12, 2018.

(51) Int. Cl.
*G21C 15/10* (2006.01)
*G21C 3/22* (2006.01)
*G21C 3/54* (2006.01)
*G21C 7/28* (2006.01)

(58) Field of Classification Search
USPC ....... 376/290, 458, 348, 350, 359, 360, 399, 376/404, 459, 904
See application file for complete search history.

(56) References Cited

U.S. PATENT DOCUMENTS

| | | | |
|---|---|---|---|
| 2,874,106 A | 2/1959 | Hammond et al. | |
| 2,920,024 A | 1/1960 | Barton et al. | |
| 2,945,794 A | 7/1960 | Winters et al. | |
| 3,018,239 A | 1/1962 | Happell et al. | |
| 3,029,130 A | 4/1962 | Moore | |
| 3,046,212 A | 7/1962 | Anderson | |
| 3,136,700 A | 6/1964 | Poppendiek et al. | |
| 3,178,356 A | 4/1965 | Wheelock | |
| 3,203,867 A * | 8/1965 | Williams | G21C 1/322 376/288 |
| 3,216,901 A | 11/1965 | Teitel | |
| 3,218,160 A | 11/1965 | Knighton et al. | |
| 3,262,856 A | 7/1966 | Bettis | |
| 3,287,225 A | 11/1966 | Ackroyd et al. | |
| 3,368,945 A | 2/1968 | Keller et al. | |
| 3,383,285 A | 5/1968 | Ackroyd et al. | |
| 3,450,198 A | 6/1969 | Brunner | |
| 3,644,173 A * | 2/1972 | Magladry | G21C 7/26 376/350 |
| 3,743,577 A | 7/1973 | Bettis et al. | |
| 3,785,924 A | 1/1974 | Notari | |
| 3,909,351 A | 9/1975 | Tilliette | |
| 3,996,099 A | 12/1976 | Faugeras et al. | |
| 3,997,413 A | 12/1976 | Fougner | |
| 4,039,377 A | 8/1977 | Andrieu et al. | |
| 4,045,286 A * | 8/1977 | Blum | G21C 1/32 376/288 |
| 4,056,435 A | 11/1977 | Carlier et al. | |
| 4,216,821 A | 8/1980 | Robin | |
| 4,284,473 A | 8/1981 | Kasama | |
| 4,309,252 A | 1/1982 | Gilroy | |
| 4,342,721 A | 8/1982 | Pomie | |
| 4,397,778 A | 8/1983 | Lloyd | |
| 4,639,350 A | 1/1987 | Malaval | |
| 4,762,667 A | 8/1988 | Sharbaugh | |
| 4,786,464 A | 11/1988 | Bardot | |
| 4,820,476 A | 4/1989 | Popalis | |
| 5,185,120 A | 2/1993 | Fennern | |
| 5,196,159 A | 3/1993 | Kawashima et al. | |
| 5,223,210 A | 6/1993 | Hunsbedt et al. | |
| 5,380,406 A | 1/1995 | Horton et al. | |
| 5,421,855 A | 6/1995 | Hayden et al. | |
| 6,181,759 B1 | 1/2001 | Heibel | |
| 7,217,402 B1 | 5/2007 | Miller et al. | |
| 8,416,908 B2 | 4/2013 | Mann | |
| 8,594,268 B2 | 11/2013 | Shu | |
| 8,734,738 B1 | 5/2014 | Herrmann | |
| 9,171,646 B2 | 10/2015 | Moses et al. | |
| 9,721,678 B2 | 8/2017 | Cheatham et al. | |
| 10,043,594 B2 | 8/2018 | Scott | |
| 10,438,705 B2 | 10/2019 | Cheatham | |
| 10,497,479 B2 | 12/2019 | Abbott et al. | |
| 11,367,536 B2 | 6/2022 | Abbott et al. | |
| 2004/0114703 A1 | 6/2004 | Bolton et al. | |
| 2005/0220251 A1 | 10/2005 | Yokoyama et al. | |
| 2008/0232533 A1 | 9/2008 | Blanovsky | |
| 2008/0273650 A1 | 11/2008 | Yokoyama et al. | |
| 2008/0310575 A1 | 12/2008 | Cinotti | |
| 2009/0279658 A1 | 11/2009 | Leblanc | |
| 2010/0226471 A1 | 9/2010 | Cinotti | |
| 2011/0142190 A1 * | 6/2011 | Ikeda | G21C 1/07 376/399 |
| 2011/0222642 A1 | 9/2011 | Gautier | |
| 2011/0286563 A1 | 11/2011 | Moses et al. | |
| 2012/0027156 A1 | 2/2012 | Peterson | |
| 2012/0051481 A1 | 3/2012 | Shu | |
| 2012/0056125 A1 | 3/2012 | Raade et al. | |
| 2012/0183112 A1 | 7/2012 | LeBlanc | |
| 2012/0275558 A1 | 11/2012 | Cinotti | |
| 2012/0288048 A1 | 11/2012 | Mann | |
| 2012/0314829 A1 | 12/2012 | Greene | |
| 2013/0083878 A1 | 4/2013 | Massie et al. | |
| 2013/0180520 A1 | 7/2013 | Raade et al. | |
| 2013/0272470 A1 | 10/2013 | Whitten et al. | |
| 2014/0023172 A1 | 1/2014 | Leblanc | |
| 2014/0166924 A1 | 6/2014 | Raade et al. | |
| 2014/0348287 A1 | 11/2014 | Huke et al. | |
| 2015/0010875 A1 | 1/2015 | Raade et al. | |
| 2015/0036779 A1 | 2/2015 | LeBlanc | |
| 2015/0078504 A1 | 3/2015 | Woolley | |
| 2015/0117589 A1 | 4/2015 | Kamei | |
| 2015/0170766 A1 | 6/2015 | Singh et al. | |
| 2015/0228363 A1 | 8/2015 | Dewan et al. | |
| 2015/0243376 A1 | 8/2015 | Wilson | |
| 2015/0310943 A1 | 10/2015 | Kielb et al. | |
| 2015/0357056 A1 | 12/2015 | Shayer | |
| 2016/0005497 A1 | 1/2016 | Scott | |
| 2016/0189806 A1 | 6/2016 | Cheatham, III et al. | |
| 2016/0189812 A1 | 6/2016 | Czerwinski et al. | |
| 2016/0189813 A1 | 6/2016 | Cisneros et al. | |
| 2016/0196885 A1 | 7/2016 | Singh | |
| 2016/0217874 A1 | 7/2016 | Dewan et al. | |
| 2016/0260505 A1 | 9/2016 | Cadell et al. | |
| 2016/0260509 A1 | 9/2016 | Kim et al. | |
| 2016/0300628 A1 | 10/2016 | Fortino et al. | |
| 2017/0084355 A1 | 3/2017 | Scott | |
| 2017/0092381 A1 | 3/2017 | Cisneros et al. | |
| 2017/0117065 A1 | 4/2017 | Scott | |
| 2017/0213610 A1 | 7/2017 | Sumita et al. | |
| 2017/0301413 A1 | 10/2017 | Cisneros et al. | |
| 2017/0301418 A1 | 10/2017 | Dodson et al. | |
| 2017/0301421 A1 | 10/2017 | Abbott et al. | |
| 2017/0316840 A1 | 11/2017 | Abbott et al. | |
| 2017/0316841 A1 | 11/2017 | Abbott et al. | |
| 2018/0019025 A1 | 1/2018 | Abbott et al. | |
| 2018/0047467 A1 | 2/2018 | Czerwinski et al. | |
| 2018/0068750 A1 | 3/2018 | Cisneros et al. | |
| 2018/0137944 A1 | 5/2018 | Abbott et al. | |
| 2018/0277260 A1 | 9/2018 | Marcille et al. | |
| 2019/0172594 A1 | 6/2019 | Lyons et al. | |
| 2019/0237205 A1 | 8/2019 | Abbott et al. | |
| 2019/0311816 A1 | 10/2019 | Sumita et al. | |
| 2020/0118698 A1 | 4/2020 | Cheatham et al. | |
| 2020/0122109 A1 | 4/2020 | Kruizenga et al. | |
| 2020/0185114 A1 | 6/2020 | Abbott et al. | |
| 2020/0357531 A1 | 11/2020 | Inman et al. | |
| 2021/0202117 A1 | 7/2021 | Nelson | |
| 2022/0076854 A1 | 3/2022 | Ougouag et al. | |

FOREIGN PATENT DOCUMENTS

| | | |
|---|---|---|
| CN | 105684090 | 6/2016 |
| DE | 1112791 | 10/1963 |
| DE | 1439107 | 2/1969 |
| EP | 0617430 | 9/1994 |
| EP | 33570680 | 8/2018 |
| FR | 2296248 | 11/1977 |
| GB | 739968 | 11/1955 |
| GB | 835266 | 5/1960 |
| GB | 964841 | 7/1964 |
| GB | 2073938 B | 7/1984 |
| GB | 2508537 | 12/2014 |
| JP | 571991 | 1/1982 |
| JP | 1991282397 | 12/1991 |
| JP | 06174882 | 6/1994 |
| JP | 2001133572 | 5/2001 |

(56) References Cited

FOREIGN PATENT DOCUMENTS

| | | |
|---|---|---|
| JP | 2014119429 | 12/2012 |
| RU | 57040 U1 | 9/2006 |
| RU | 2424587 | 7/2011 |
| WO | 2009135286 | 11/2009 |
| WO | 2013116942 | 8/2013 |
| WO | 2013180029 | 12/2013 |
| WO | 2014074930 | 5/2014 |
| WO | 2014128457 | 8/2014 |
| WO | 2014196338 | 12/2014 |
| WO | 2015140495 | 9/2015 |
| WO | 2016109565 | 7/2016 |
| WO | 2016197807 | 12/2016 |
| WO | 2018013317 | 1/2018 |
| WO | 2018026429 | 2/2018 |
| WO | 2021133952 | 1/2021 |

OTHER PUBLICATIONS

Gehin, Jess C., and Jeffrey J. Powers. "Liquid fuel molten salt reactors for thorium utilization." Nuclear Technology 194.2 (2016): 152-161. (Year: 2016).*
PCT/US2020/066908 Search report and written opinion, dated Aug. 16, 2021, 22 pages.
Rykhlevskii, Andrei, et al., Fuel Cycle Performance of Fast Spectrum Molten Salt Reactor Designs. Oak Ridge National Lab (ORNL), Oak Ridge, TN (United States), 2019. (Year: 2019), 13 pages.
Reactor Start-up Procedure. Technical University Dresden. Reactor Training Course, pp. 3-4. <https://tu-dresden.de/ing/maschinenwesen/iet/wket/ressourcen/dateien/akr2/Lehrmaterialien/start_e.pdf?lang=en>. (Mar. 2015), 21 pgs.
Scott, Ian and Durham John, the Simple Molten Salt Reactor, Practical, safe and cheap, Moltex Energy LLP presentation slides, 19 pgs.
Scott, Ian: Safer, cheaper nuclear: The simple molten salt reactor, http://www.ee.co.za/article/safer-cheaper-nuclear-simple-molten-salt-reactor.html, Dec. 2, 2014, 10 pages.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971.
Transatomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Wang, Jun-Wei et al.: "Influence of $MgC_{12}$ content on corrosion behavior of GH1140 in molten $NaCl-MgCl_2$ as thermal storage medium", Solar Energy Materials and Solar Cells, Elsevier Science Publishers, Amsterdam, NL, vol. 179, Nov. 20, 2017, pp. 194-201, ISSN: 0927-0248.
Xu et al., Thorium Energy R&D in China, THEO13, CERN, Oct. 28, 2013, 59 pgs.
Sabharwall, Piyush, et al., "Small Modular molten salt reactor (SM-MSR), "Small Modular Reactors Symposium. vol. 54730. 2011.
Abbott et al, Thermal and Mechanical Design Aspects of the LIFE Engine, Fusion Science and Technology Dec. 2008; 56(2).
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
ASTM International, Designation: B898-11, Standard Specification for Reactive and Relactory Metal Clad Plate (Sep. 2011), 15 pages.
Clarno, K.T. et al., "Trade studies for the liquid-salt-cooled very high-temperature reactor fiscal year 2006 progress report", ORNL/TM-2006 140 (2007), 35 pgs.
Cohen et al., "Vanadium-Lined HT9 Cladding Tubes", Argonne National Lab ANL/ET/CP-80384, (Feb. 1994), 12 pgs.
Donnelly et al., Fabrication of Heat Exchanger Tube Bundle for the Molten-Salt Reactor Experiment, ORNL-3500, Dec. 9, 1963.
EP15876187.4 European Extended Search Report for EP 15876187.4 dated Sep. 11, 2018, 10 pages.
ESR20211581.2 European Extended Search Report in European Application EP 20 21 1581.2, dated Mar. 24, 2021, 8 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor(FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter," AIP Conf. Proc. 694, 403 (2003).
GEN IV International Forum, Molten Salt Reactor (MSR), https://www.gen-4.org/gif/jcms/c_9359/msr, accessed Feb. 26, 2016, 3 pgs.
Grimes, W. R., "Molten-Salt Reactor Chemistry," Nucl. Appl. Technol. vol. 8, 137-155 (1970).
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.
Holcomb, et al. Fast Spectrum Molten Salt Reactor Options, Jul. 2011, 46 pages. Available at: http://info.ornl.gov/sites/publications/files/Pub29596.pdf.
Kimura—Neutron Spectrum in Small Iron Pile Surrounded by Lead Reflector, Journal of Nuclear Science and Technology, 15(3), pp. 183-191 (Mar. 1978).
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Kuznetsov et al., Electrochemical Behavior and Some Thermodynamic Properties of $UCl$ [sub 4] and $UCl$ [sub 3] Dissolved in a $LiCl—KCl$ Eutectic Melt, Journal of the Electrochemical Society, vol. 152, No. 4, Jan. 2005, 11 pages.
Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.
Merle-Lucotte, E., Introduction to the Physics of the Molten Salt Fast Reactor, Thorium Energy Conference 2013 (ThEC13), 2013.
Molten Salt Reactor (MSR) Review: Feasibility Study of developing a pilot scale molten salt reactor in the UK, Jul. 2015, Energy Process Development, LTD (available at www.energyprocessdevelopments.com).
Mourogov et al., Potentialities of the fast spectrum molten salt reactor concept: REBUS-3700, Energy Conversion and Management, Mar. 30, 2006, vol. 47, No. 17, pp. 2761-2771.
MSR-FUJI General Information, Technical Features, and Operating Characteristics.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982.
Ottewitte, E. H., Cursory First Look at the Molten Chloride Fast Reactor as an Alternative to the Conventional BATR Concept.
PCT/US2020/066599 ISR + WO dated May 17, 2021, 17 pages.
PCT/US2015/067905 ISR + WO—International Search Report and Written Opinion in International Application PCT/US2015/067905 dated Aug. 5, 2016, 18 pages.

(56) References Cited

OTHER PUBLICATIONS

PCT/US2015/067923 ISR + WO—International Search Report and Written Opinion in International Application PCT/US2015/067923, dated Apr. 19, 2016.
PCT/US2016/055001 IPRP + WO—International Preliminary Report on Patentability and Written Opinion dated Jan. 12, 2018, 9 pages.
PCT/US2016/055001 ISR + WO—International Search Report and Written Opinion in International Application PCT/US2016/055001, dated Jan. 25, 2017, 11 pages.
PCT/US2017/030455 IPRP—International Preliminary Report on Patentability dated Nov. 6, 2018, 17 pages.
PCT/US2017/030455 ISR + WO—International Search Report and Written Opinion dated Jan. 30, 2018, 23 pages.
PCT/US2017/030457 IPRP—International Preliminary Report on Patentability dated Nov. 15, 2018, 15 pages.
PCT/US2017/030457 ISR + WO—International Search Report and Written Opinion in International Application PCT/US2017/030457, dated Jan. 23, 2018, 20 pages.
PCT/US2017/030666 ISR + WO, dated Jul. 20, 2017.
PCT/US2017/030666 PCT International Preliminary Reporton Patentability in International Application PCT/US2017/030666 dated Nov. 6, 2018, 9 pages.
PCT/US2017/030672 ISR + WO—International Search Report and Written Opinion in International Application No. PCT/US2017/030672, dated Sep. 27, 2017, 9 pages.
PCT/US2017/038806 IPRP + WO—International Preliminary Report on Patentability and Written Opinion in International Application PCT/US2017/038806, dated Jan. 15, 2019, 7 pgs.
PCT/US2017/038806 ISR + WO—International Search Report and Written Opinion dated Oct. 16, 2017.
PCT/US2017/046139 IPRP + WO—International Preliminary Report on Patentability and Written Opinion dated Feb. 12, 2019, 8 pgs.
PCT/US2017/046139 ISR + WO—International Search Report and Written Opinion, dated Jan. 17, 2018, 16 pgs.
PCT/US2017/061843 IPRP + WO—International Preliminary Report on Patentability and Written Opinion in International Application PCT/US2017/061843, dated May 21, 2019, 13 pages.
PCT/US2017/061843 ISR + WO—International Search Report and Written Opinion in International Application PCT/US2017/061843, dated Oct. 29, 2018, 23 pages.
PCT/US2019/015967 ISR + WO—International Search Report and Written Opinion of PCT/US2019/015967, dated Mar. 12, 2019, 25 pages.
PCT/US2019/021791 IPRP—PCT International Preliminary Reporton Patentability in International Application PCT/US2019/021791, dated Sep. 24, 2020, 9 pages.
PCT/US2019/021791 ISR + WO—International Search Report and Written Opinion in International Application PCT/US2019/021791, dated Nov. 19, 2019, 15 pages.
PCT/US2019/051345 ISR + WO—International Search Report and Written Opinion in International Application PCT/US2019/051345, dated Mar. 5, 2020, 15 pages.
Andreades, Design Summary of the Mark-I Pebble-Bed, Fluoride Salt-Cooled, High-Temperature Reactor Commercial Power Plant, Nuclear Technology, vol. 195(3), Sep. 2016, pp. 223-238.
ORNL-2474 (Oak Ridge National Laboratory), Molten-Salt Reactor Program Quarterly Progress Report for Period Ending Jan. 31, 1958, H.G. MacPherson, Program Director, Date Issued May 1, 1958, pp. 41-44.
Patent Search Report, Eurasian Patent Office, Eurasian application No. 202193104, dated May 19, 2022, 2 pages.

\* cited by examiner

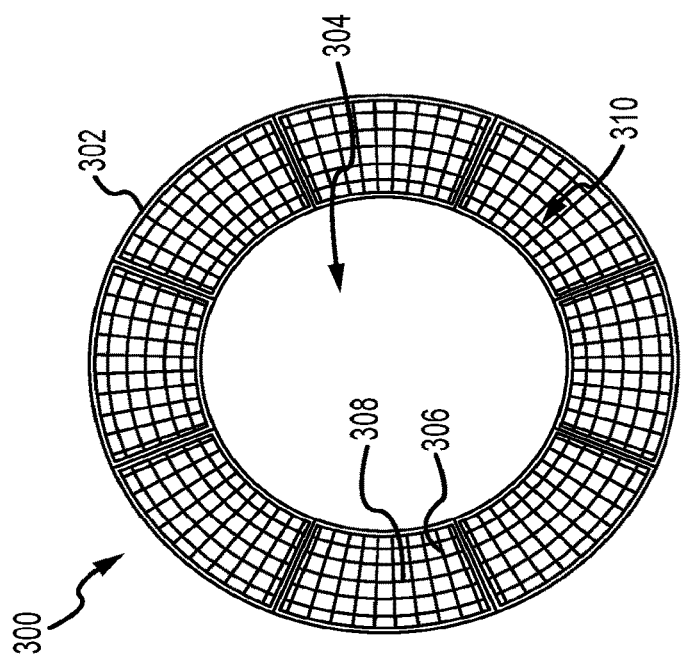
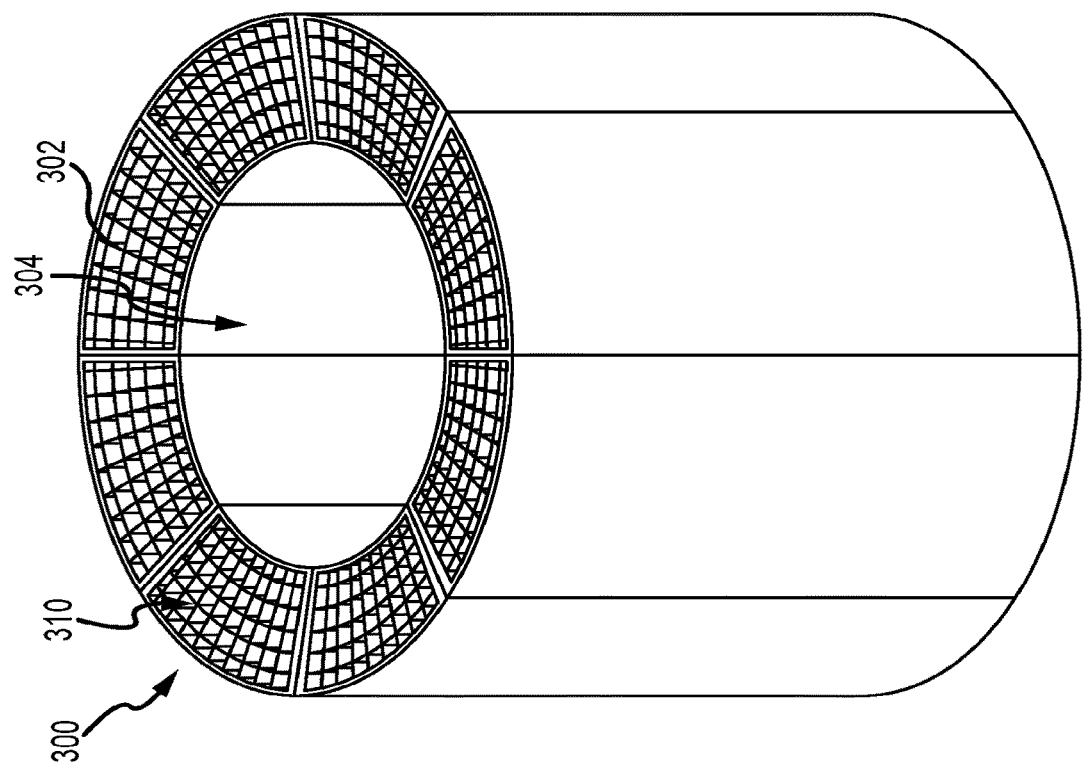
FIG.3B
FIG.3A

REFLECTORS FOR MOLTEN CHLORIDE FAST REACTORS

RELATED APPLICATIONS

The present application is a continuation of U.S. patent application Ser. No. 16/299,783, now U.S. Pat. No. 11,075, 015, filed Mar. 12, 2019, which claims priority to and the benefit of U.S. Provisional Patent Application No. 62/641, 756, titled "REFLECTORS FOR MOLTEN CHLORIDE FAST REACTORS," filed Mar. 12, 2018, the entire disclosure of which are incorporated by reference herein.

INTRODUCTION

The utilization of molten fuels in a nuclear reactor to produce power provides significant advantages as compared to solid fuels. For instance, molten fuel reactors generally provide higher average core power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts as well as using fluoride salts of thorium. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

SUMMARY

In one aspect, the technology relates to a reflector assembly for a molten chloride fast reactor (MCFR) including: a support structure including a substantially cylindrical base plate, a substantially cylindrical top plate, and a plurality of circumferentially spaced ribs extending between the base plate and the top plate, wherein the support structure is configured to encapsulate a reactor core for containing nuclear fuel; and a plurality of tube members disposed within the support structure and extending axially between the top plate and the bottom plate, wherein the plurality of tube members are configured to hold at least one reflector material to reflect fission born neutrons back to a center of the reactor core.

In an example, each tube member of the plurality of tube members includes a substantially similar diameter. In another example, the plurality of tube members includes two or more tube members having different diameters. In yet another example, each tube member of the plurality of tube members are disposed within the support structure so that adjacent tube members are abutted to each other at a tangency location. In still another example, the plurality of tube members include two or more tube members having different wall thicknesses. In an example, an interstitial space is defined between the plurality of tube members, and wherein a packing fraction of the at least one reflector material relative to the plurality of tube members and the interstitial space is greater than, or equal to, 70%.

In another example, the packing fraction is greater than, or equal to, approximately 87%. In yet another example, the interstitial space is configured to hold fuel salt or coolant fluid. In still another example, the interstitial space is devoid of material. In an example, the plurality of tube members are packed within the support structure and devoid of welds. In another example, the at least one reflector material includes liquid lead and/or graphite.

In another aspect, the technology relates to a reflector assembly for a MCFR including: at least one reflector structure, wherein the at least one reflector structure is circumferentially arrangeable in a substantially cylindrical shape that encapsulates a reactor core for containing nuclear fuel; and one or more tank sections disposed within the at least one reflector structure, wherein the one or more tank sections are configured to hold at least one reflector material to reflect fission born neutrons back to a center of the reactor core.

In an example, the at least one reflector structure defines a longitudinal axis, and wherein the at least one reflector structure includes two or more tank sections of the one or more tanks sections, each of the two of more tank sections axially aligned along the longitudinal axis. In another example, each of the two or more tanks sections are formed by individual and separable reflector structures. In yet another example, the reflector assembly further includes a support structure that holds the at least one reflector structure in the substantially cylindrical shape.

In another aspect, the technology relates to a method of reflecting fission born neutrons back to a center of a reactor core containing high temperature nuclear fuel, the method including: encapsulating the reactor core within a reflector assembly, the reflector assembly including a plurality of tank sections circumferentially arrangeable in a substantially cylindrical shape such that the reactor core is located therein; and disposing at least one reflector material into the plurality of tank sections.

In an example, the at least one reflector material is a first reflector material, and the method further includes replacing at least a portion of the first reflector material with a second reflector material. In another example, the first reflector material is liquid lead and the second reflector material is graphite. In yet another example, the plurality of tank sections include a plurality of tube members disposed within a support structure, and the method further includes channeling a fuel salt through an interstitial space that is defined between the plurality of tube members. In still another example, the plurality of tank sections is supported by a support structure, and the method further includes extracting the reflector assembly from the reactor core via the support structure and replacing at least a portion of the plurality of tank sections.

BRIEF DESCRIPTION OF THE DRAWINGS

The following drawing figures, which form a part of this application, are illustrative of described technology and are not meant to limit the scope of the technology as claimed in any manner, which scope shall be based on the claims appended hereto.

FIG. 3A is a perspective view of a central reflector for another reflector assembly.

FIG. 3B is a top view of the central reflector shown in FIG. 3A.

DETAILED DESCRIPTION

This disclosure describes various configurations and components of a molten fuel fast or thermal nuclear reactor. For the purposes of this application, embodiments of a molten fuel fast reactor that use a chloride fuel will be described. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Figure 1:
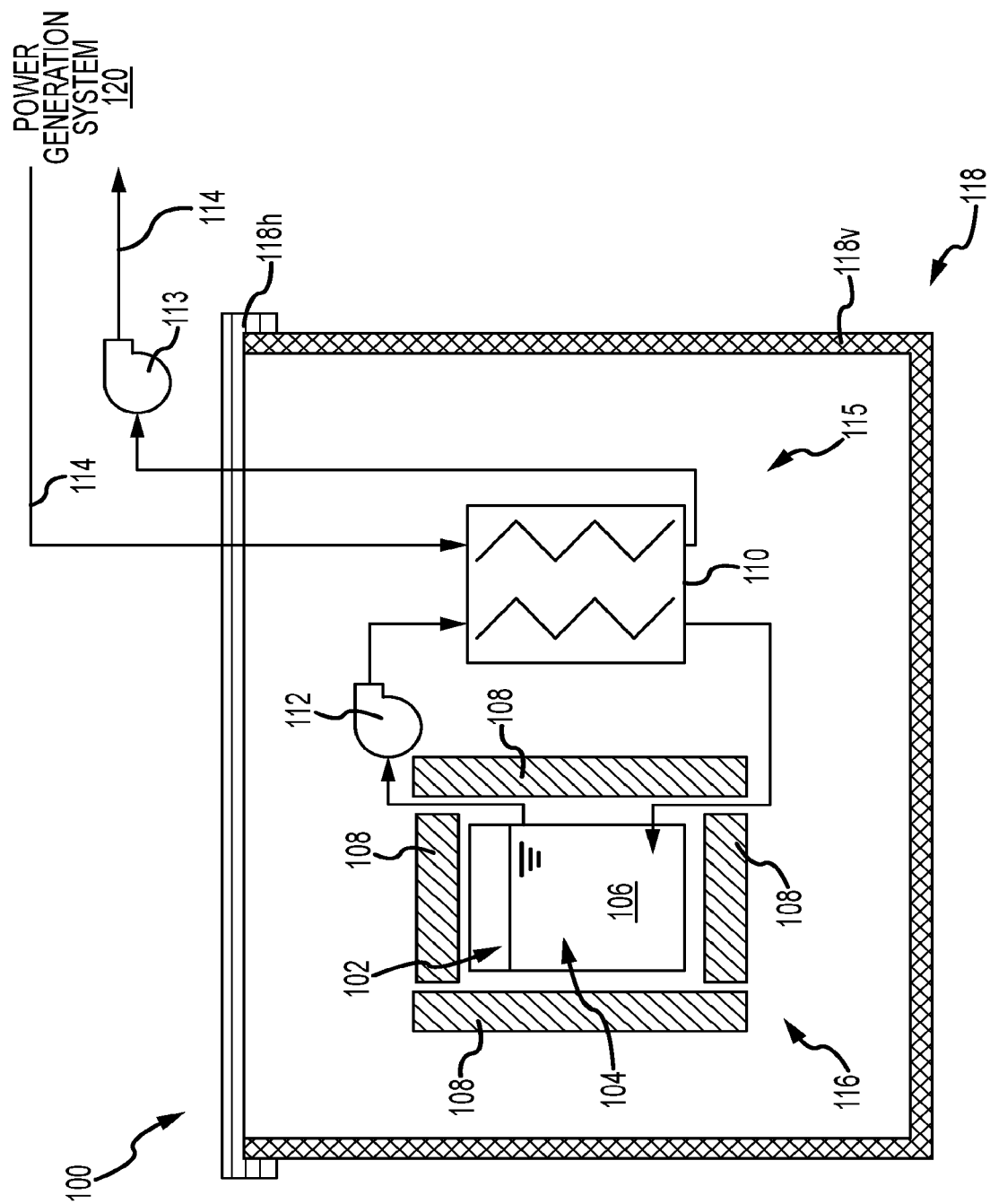
FIG. 1 illustrates, in a block diagram form, some of the basic components of a molten fuel reactor.

FIG. 1 illustrates, in a block diagram form, some of the basic components of a molten fuel reactor. In general, a molten fuel reactor 100 includes a reactor core 104 containing a fissionable fuel salt 106 that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 106 may or may not completely fill the core 104, and the embodiment shown is illustrated with an optional headspace 102 above the level of the fuel salt 106 in the core 104. The size of the reactor core 104 may be selected based on the characteristics and type of the particular fuel salt 106 being used in order to achieve and maintain the fuel in an ongoing state of criticality, during which the heat generated by the ongoing production of neutrons in the fuel causes the temperature of the molten fuel to rise when it is in the reactor core 104. The performance of the reactor 100 is improved by providing one or more reflectors 108 around the core 104 to reflect neutrons back into the core. Additionally, the reflectors 108 may shield components positioned radially outward from the core 104. The molten fuel salt 106 is circulated between the reactor core 104 and one or more primary heat exchangers 110 located outside of the core 104. The circulation may be performed using one or more pumps 112.

The primary heat exchangers 110 transfer heat from the molten fuel salt 106 to a primary coolant 114 that is circulated through a primary coolant loop 115. In an embodiment the primary coolant may be another salt, such as $NaCl$—$MgCl_2$, lead, or other liquid metal. Other coolants are also possible including Na, NaK, Na mixtures, supercritical $CO_2$, liquid lead, and lead bismuth eutectic. In an embodiment, a reflector 108 is between each primary heat exchanger 110 and the reactor core 104 as shown in FIG. 1. For example, in an embodiment a cylindrical reactor core 104, having a diameter of 2 meters (m) and a height of 3 m or greater, is oriented vertically so that the flat ends of the cylinder are on the top and bottom respectively. The entire reactor core 104 is surrounded by reflectors 108 between which are provided channels for the flow of fuel salt 106 into and out of the reactor core 104. Eight modular reflectors 108 and primary heat exchangers 110 are distributed azimuthally around the circumference of the reactor core 104, with each primary heat exchanger 110 provided with pumps to drive circulation of the fuel salt 106. In alternative embodiments, a different number of reflectors 108 and primary heat exchangers 110 may be used. For example, embodiments having 2, 3, 4, 5, 6, 8, 12, and 16 reflectors and primary heat exchangers are contemplated.

In the embodiment shown in FIG. 1, in normal (power generating) operation, the fuel salt is pumped from the reactor core 104, through the primary heat exchanger 110, and cooled fuel salt is returned back to reactor core 104. Heated primary coolant 114 from the primary heat exchangers 110 is passed to a power generation system 120 for the generation of some form of power, e.g., thermal, electrical or mechanical. The reactor core 104, primary heat exchangers 110, pumps 112, molten fuel circulation piping (including other ancillary components that are not shown such as check valves, shutoff valves, flanges, drain tanks, etc.) and any other components through which the molten fuel circulates or contacts during operation can be referred to as the fuel loop 116. Likewise, the primary coolant loop 115 includes those components through which primary coolant circulates, including the primary heat exchangers 110, primary coolant circulation piping (including other ancillary components that are not shown such as coolant pumps 113, check valves, shutoff valves, isolation valves, flanges, drain tanks, etc.).

Salt-facing elements of the heat exchanger 110 and the primary coolant loop 115 may be clad to protect against corrosion. Other protection options include protective coatings, loose fitting liners, or press-fit liners. In an embodiment, cladding on the internal surface of the tubes is molybdenum that is co-extruded with the base heat exchanger tube material. For other fuel salt contacting surfaces (exterior surfaces of the tube sheets and exterior surface of the shell), the cladding material is molybdenum alloy. Nickel and nickel alloys are other possible cladding materials. Niobium, niobium alloys, and molybdenum-rhenium alloys may be used where welding is required. Components in contact with primary cooling salt may be clad with Alloy 200 or any other compatible metals, such as materials meeting the American Society of Mechanical Engineers' pressure vessel code. The tube primary material may be 316 stainless steel or any other compatible metals. For example, in an embodiment, Alloy 617 is the shell and tube sheet material.

The molten fuel reactor 100 further includes at least one containment vessel 118 that contains the fuel loop 116 to prevent a release of molten fuel salt 106 in case there is a leak from one of the fuel loop components. The containment vessel 118 is often made of two components: a lower, vessel portion 118v that takes the form of a unitary, open-topped vessel with no penetrations of any kind; and an upper, cap portion 118h referred to as the vessel head that covers the top of the vessel portion 118v. All points of access to the reactor 100 are from the top through the vessel head 118h.

One advantage of the above described reactor 100 is in its operational mode and fuel cycle flexibility. For example, after an initial enriched fuel load, the reactor can utilize a fast spectrum burn (high-energy neutrons) to achieve a low parasitic absorption, breed & burn behavior. Breed & burn behavior is generally a mode of operation where the reactor conversion ratio exceeds 1.0 and more fissile fuel is bred than burned. This additional fissile fuel can be removed and used in subsequent daughter reactors so as to reduce the need for further fuel enrichment. After the breed & burn operations, the reactor can also utilize a thermal spectrum burn (higher neutron absorption) to achieve high parasitic absorption, burn behavior. Burn behavior is generally a mode of operation where the reactor conversion is lower than 1.0 and more fissile fuel is burned than bred. Additionally, the reactor may also operate with a reactor conversion ratio of about 1.0 so that the fissile fuel which is bred is burned.

To enable a more efficient reactor process in each operational mode, the reflectors 108 may be selectively configureable with different reflector materials so that the energy spectrum of which neutrons are reflected back into the core 104 can be shifted. For example, at the beginning of the reactor life, the reflectors 108 may include fast neutron reflector materials so that the neutrons are high-energy and a fast spectrum burn is achieved. Fast neutron reflector materials are typically large atomic weight elements that have a low neutron absorption cross-section, such as, but not limited to lead, lead oxide, lead bismuth, and tungsten. Then, toward the end of the reactor life, the reflector may transition to include reflector materials that are neutron moderators so that the neutrons are lower-energy and a thermal spectrum burn is achieved. Neutron moderator materials for softening the energy spectrum are typically small atomic weight elements, such as, but not limited to, graphite, beryllium, lithium, zirconium-hydride (ZrH), and non-graphite carbon.

Broadly speaking, this disclosure describes multiple alterations and component configurations that improve the performance of the reactor 100 described with reference to FIG. 1. For example, reflectors are described below that are configured to contain one or more reflector materials, e.g., a material that acts as a fast neutron reflector (for example, liquid lead) and/or a material that acts as a neutron moderator (for example, graphite, or a liquid containing graphite). Generally, the reflector materials are contained inside structural components which form the reflectors. In some examples, the structural components may be connected to a reflector material circuit that enables the required or desired liquid reflector material to be circulated (e.g., via natural circulation or by active pumping) through the reflector without removal of the reflector from the containment vessel. In other examples, the structural components may be removed from the containment vessel to replace and/or insert the required or desired reflector material.

Generally, the bulk portion of the reflectors 108 may be formed, but is not required to be formed, from one or more molybdenum alloy, one or more zirconium alloys (e.g., any of the ZIRCALOY™ alloys such as Zircaloy-2 and Zircaloy-4), one or more niobium alloys, one or more zirconium-niobium alloys (e.g., M5 and ZIRLO), one or more zirconium silicides (e.g., $Zr_3Si_2$), one or more magnesium peroxides (e.g., $MgO_2$), one or more nickel alloys (e.g., HASTELLOY™ N) or high temperature ferritic, martensitic, or stainless steel, steel, and the like. Other specific steel materials include, stainless steels including aluminum-containing stainless steels, advanced steels such as FeCrAl alloys, Alloy 617, HT9, oxide-dispersion strengthened steel, T91 steel, T92 steel, HT9 steel, 316 steel, 304 steel, an APMT (Fe-22 wt. % Cr-5.8 wt. % Al), and Alloy 33 (a mixture of iron, chromium, and nickel, nominally 32 wt. % Fe-33 wt.% Cr-31 wt. % Ni).

Similar to the salt-facing elements of the reactor, the reflector material elements of the reflector may be clad to protect against corrosion. Other protection options include protective coatings, loose fitting liners, or press-fit liners. In an embodiment, cladding on the internal and/or exterior surface of the tubes is molybdenum. The cladding material may also include molybdenum alloy, nickel, and nickel alloys, while niobium, niobium alloys, and molybdenum-rhenium alloys may be used where welding is required. Components may also use subsurface ceramic coatings. For example, in an embodiment, Alloy 617 is the material the reflector is formed out of.

Figure 2A:
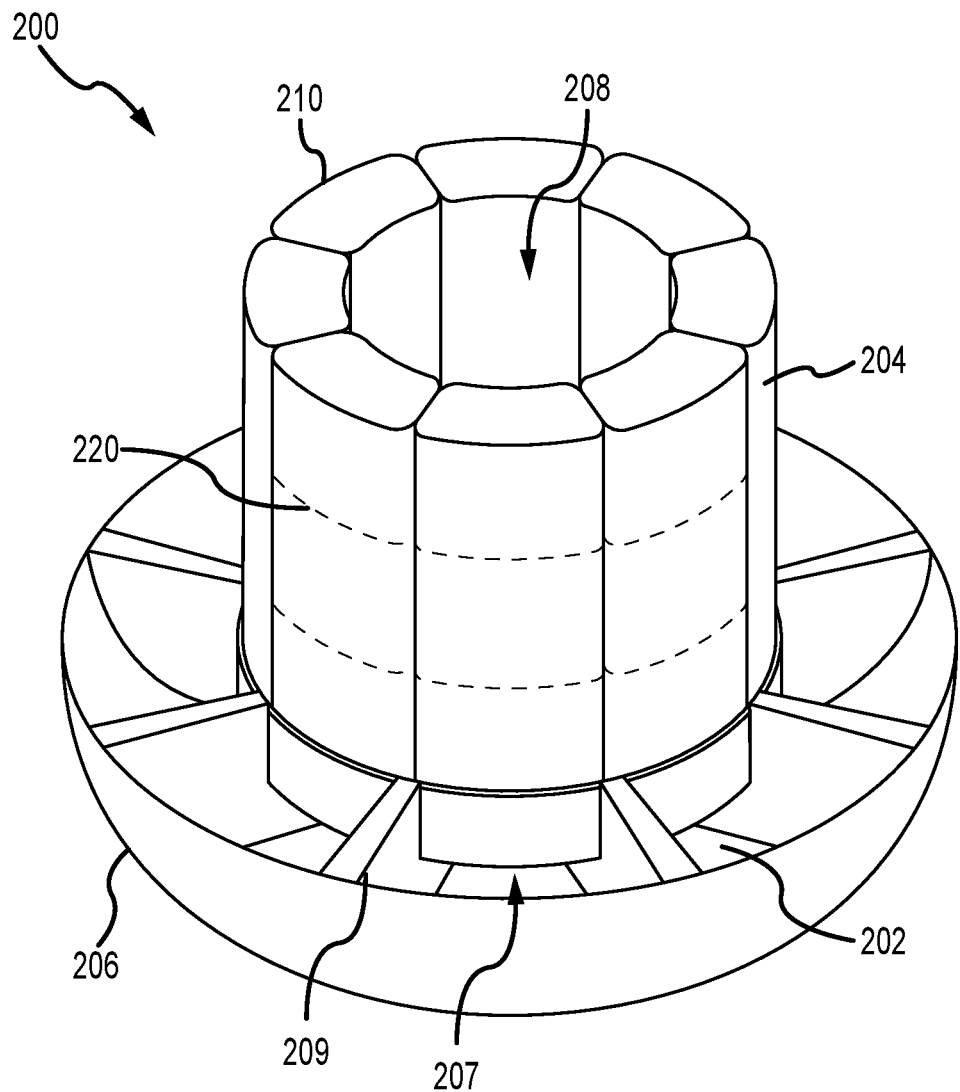
FIG. 2A is a partial perspective view of an exemplary reflector assembly for use in the molten fuel reactor shown in FIG. 1.
Figure 2B:
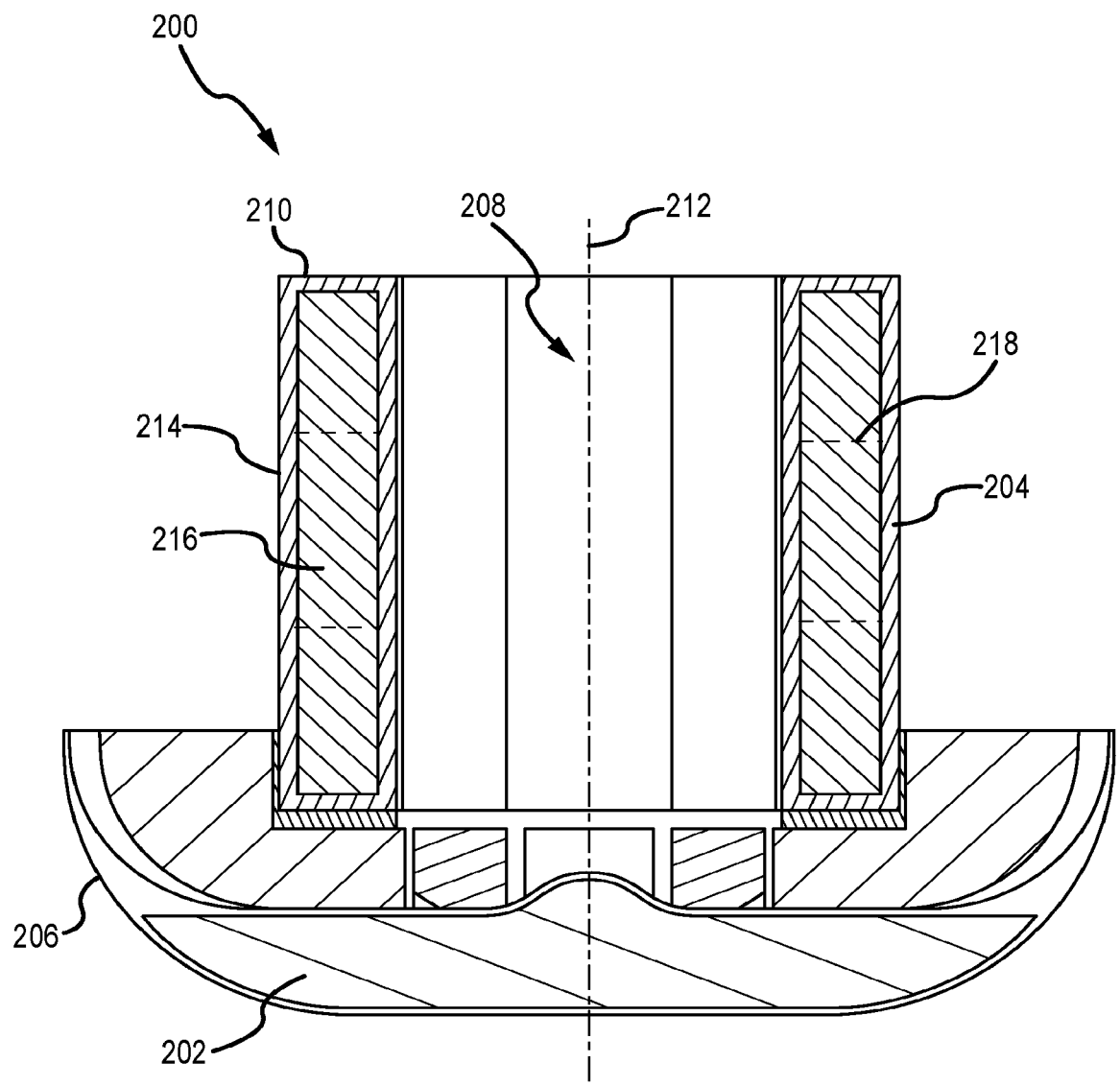
FIG. 2B is a partial longitudinal cross-sectional view of the reflector assembly shown in FIG. 2A.

FIG. 2A is a partial perspective view of an exemplary reflector assembly 200 for use in the molten fuel reactor 100 (shown in FIG. 1). FIG. 2B is a partial longitudinal cross-sectional view of the reflector assembly 200. Referring concurrently to FIGS. 2A and 2B, the reflector assembly 200 includes a lower reflector 202 and a central reflector 204, while an upper reflector is not shown for clarity. The lower reflector 202 is disposed within a flow guide 206 that enables the fuel salt flow to be channeled (e.g., via flow channels 207 defined by radially extending walls 209) from the primary heat exchanger back into a reactor core 208 as described above. The central reflector 204 includes a plurality of reflector structures 210 that are circumferentially arranged about a longitudinal axis 212 to encapsulate the reactor core 208 in a substantially cylindrical shape. In the example, there are 8 reflector structures 210 that form the cylindrical core. Although, other configurations are also contemplated. By making the reflector structures 210 modular, the central reflector 204 is more easily replaced (e.g., periodically every 4-5 years) so as to increase overall reactor performance, efficiency, and availability during its life-cycle.

At least one tank section 214 is disposed within the reflector structure 210 and is configured to hold at least one reflector material 216 so that fission born neutrons are reflected back to a center of the reactor core 208. In the example, the reflector structure 210 forms a single tank section 214 such that the entire reflector structure 210 is a large tank configured to hold the reflector material 216. Because of the high hydrostatic pressure forces generated by the reflector material 216, for example, liquid lead which is a dense material, the walls of the reflector structure/tank are relatively thick as compared to other reflector configurations described below. In one example, the reflector structure/tank may be formed with Alloy 617 having a wall thickness of approximately 100 millimeters (mm) or greater. In other examples, the reflector structure/tank may include internal reinforcement members so as to increase the strength thereof and prevent the walls from buckling under the hydrostatic pressure loads.

Depending on the fuel cycle operation of the reactor core, each of the reflector structures 210 may contain a similar reflector material 216 (e.g., liquid lead for a fast spectrum burn or graphite for a thermal spectrum burn). In other examples, two or more of the reflector structures 210 may contain a different reflector material 216 so that the energy spectrum reflection of the reflector assembly can be specifically modified to a fuel cycle operation as required or desired. Due to the modularity of the reflector structures 210, the reflector material 216 may be changed out during the replacement of the central reflector 204 as needed for the life-cycle of the reactor. Additionally or alternatively, the tank sections 214 may be coupled to a reflector material circuit (not shown) that drains spent reflector material from the tank sections 214 and pumps new reflector material (either the same material or a different material) into the tank sections 214 without needing to remove the reflector structures 210 from the containment vessel.

In another example, the reflector structure 210 may be internally divided such that two or more tank sections 218 are formed within the reflector structure and configured to hold the reflector material 216 as illustrated in FIG. 2B. The tank sections 218 are axially aligned along the longitudinal axis 212 so as to lower the hydrostatic pressure forces generated by the reflector material 216 such that the thickness of the reflector structure/tank walls may be reduced. Each tank section 218 may have a similar reflector material, or a different reflector material, and/or coupled to the reflector material circuit as described above. Alternatively, the reflector structure 210 may be divided along the longitudinal axis 212 such that the tank sections 218 may extend axially along the reactor core 208.

In other examples, the reflector structure 210 may be divided such that two or more individual and separable tank sections 220 form the reflector structure as illustrated in FIG. 2A. The tank sections 220 lower the hydrostatic pressure forces generated by the reflector material 216 as described above and are configured to be axially stacked to form the reactor core 208. By further compartmentalizing the reflector structure 210 the modularity of the reflector assembly 200 is further increased. Each tank section 220 may have a similar reflector material, or a different reflector material, and/or coupled to the reflector material circuit as described above. Alternatively, the reflector structure 210 may be divided along the longitudinal axis 212 such that the tank sections 220 may extend axially along the reactor core 208.

Figure 2D:
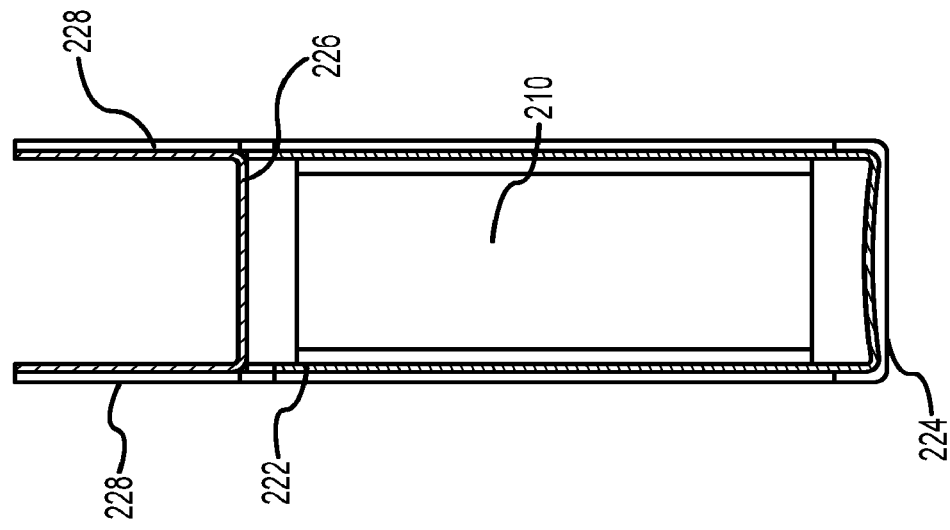
FIG. 2D is a circumferential cross-sectional view of the support structure shown in FIG. 2C.
Figure 2C:
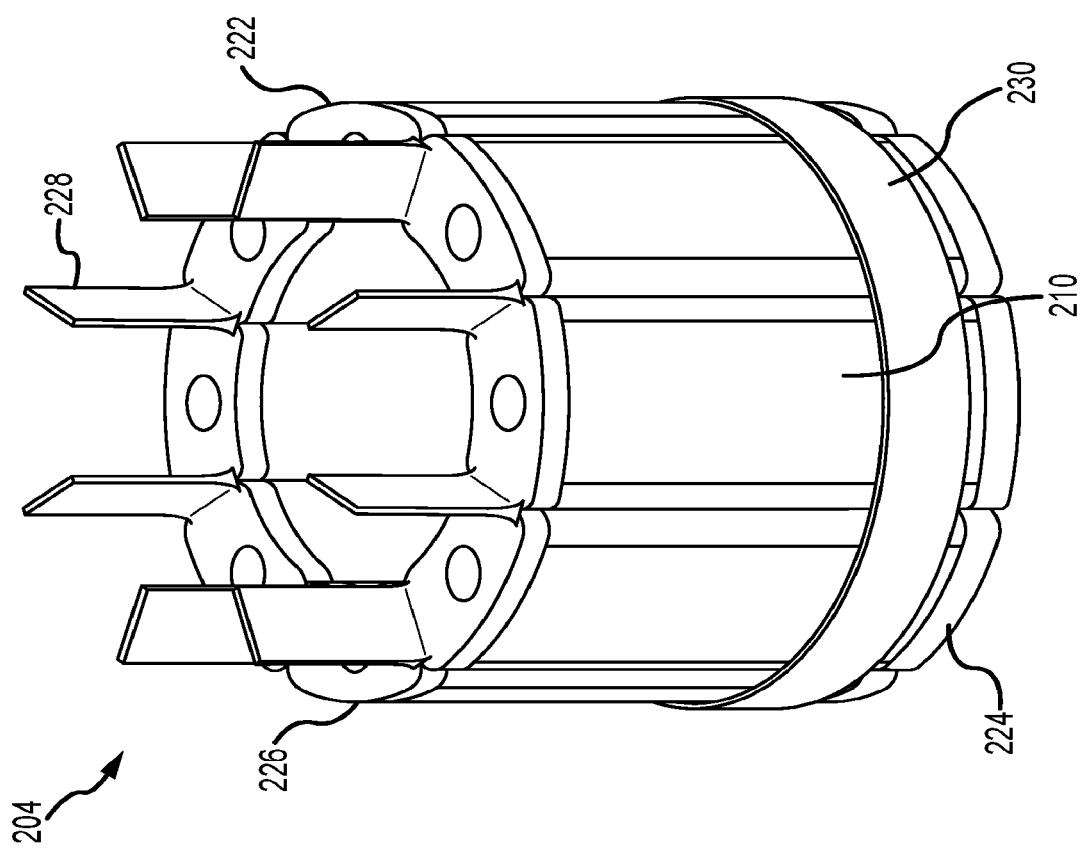
FIG. 2C is a perspective view of a support structure for use with the reflector assembly shown in FIG. 2A.

FIG. 2C is a perspective view of a support structure 222 for use with the central reflector 204 of the reflector assembly 200 (shown in FIG. 2A). FIG. 2D is a circumferential cross-sectional view of the support structure 222 shown in FIGS. 2C. Referring concurrently to FIGS. 2C and 2D, the support structure 222 holds the reflector structures 210 in place within the reactor core and enables the central reflector 204 to be lifted from the containment vessel for maintenance and/or replacement. The support structure 222 is formed from solid components made of high temperature alloys (e.g., Alloy 617). In the example, the support structure 222 is a frame that includes a substantially cylindrical base plate 224, a substantially cylindrical top plate 226, and a plurality of circumferentially spaced ribs 228 that extend between the plates 224, 226. Each reflector structure 210 is secured within this frame. In some examples, one or more restraint hoops 230 may be positioned around the outer perimeter of the central reflector 204 in order to support the assembly for lateral loads. Additionally, the ribs 228 may extend above the top plate 226 to form exit flow channels for the fuel salt during reactor operation as described above.

FIG. 3A is a perspective view of a central reflector 300 for another reflector assembly. FIG. 3B is a top view of the central reflector 300. Referring concurrently to FIGS. 3A and 3B, certain components of the reflector assembly are described above and, as such, are not described further. As described above, the central reflector 300 includes a plurality of reflector structures 302 that are circumferentially arranged about a longitudinal axis to encapsulate a reactor core 304 in a substantially cylindrical shape. In this example, however, the reflector structure 302 includes a grid pattern of radial members 306 and circumferential members 308. For example, the radial members 306 and circumferential members 308 may be 6.25 mm thick plates. This grid pattern forms a plurality of tank sections 310 that are configured to hold at least one reflector material within the reflector structure 302.

Each tank section 310 may selectively contain a reflector material to configure the energy spectrum reflection of the reflector assembly for any fuel cycle operation as required or desired. In the example, the radial members 306 are spaced approximately 4.4° apart from one another and the circumferential members 308 are spaced approximately 100 mm apart from one another. It is appreciated that any other spacing as required or desired may also be utilized. In one example, the reflector structure 302, radial members 306, and circumferential members 308 may be formed (e.g., cast or additively manufactured) as a monolithic piece. In another example, the radial members 306 and circumferential members 308 may be welded, friction fit, or brazed within the reflector structure 302.

In some examples, not every tank section 310 may include a reflector material. At least one tank section 310 may be devoid of a reflector material and is only a void space. In another example, at least one tank section 310 may contain a fuel salt or a coolant salt that enables heat to be removed from the reflector assembly. Selectively locating voids and/or fuel salt tanks within the reflector structure further enables the energy spectrum reflection of the reflector assembly to be configured as required or desired.

Figure 4B:
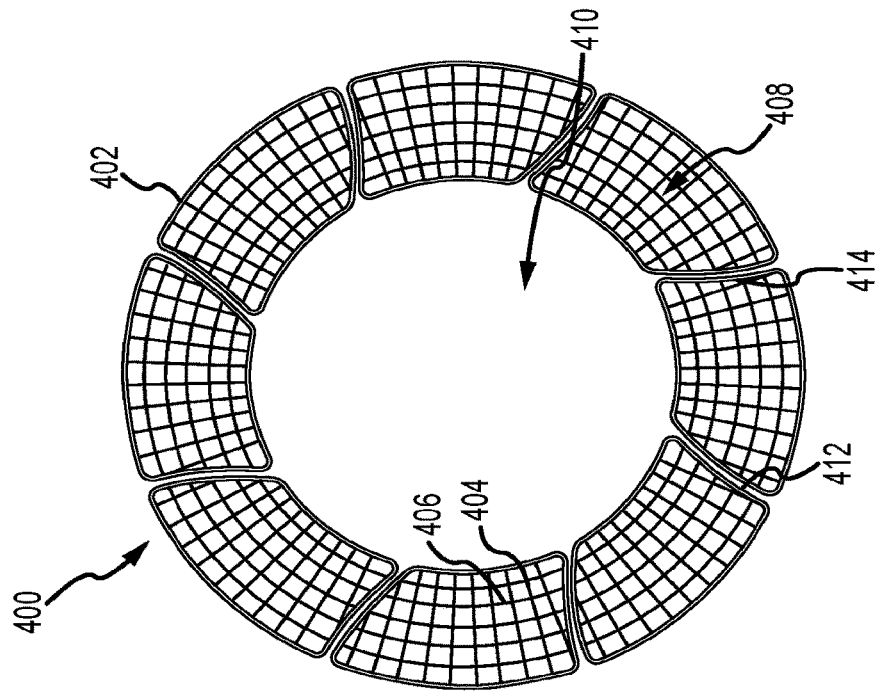
FIG. 4B is a top view of the central reflector shown in FIG. 4A.
Figure 4A:
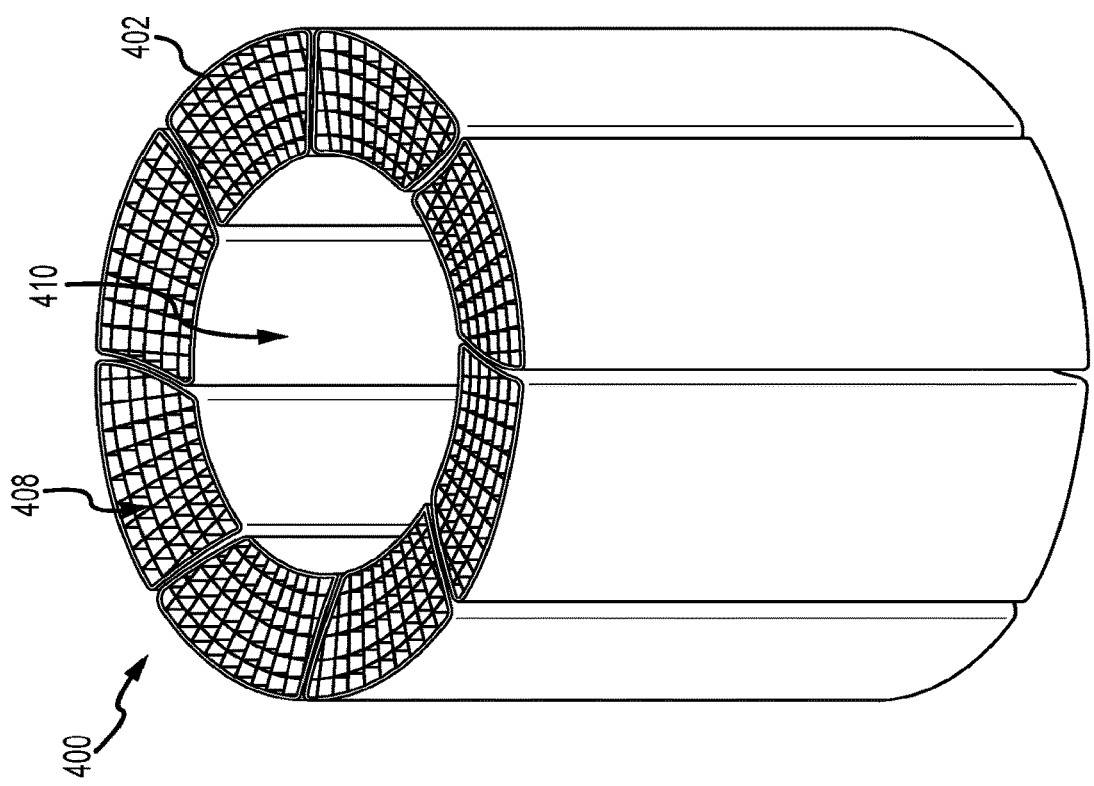
FIG. 4A is a perspective view of another central reflector.

FIG. 4A is a perspective view of another central reflector 400. FIG. 4B is a top view of the central reflector 400. Referring concurrently to FIGS. 4A and 4B, certain components of the central reflector are describe above in reference to FIGS. 3A and 3B and, as such, are not described further. As described above, the central reflector 400 includes a plurality of reflector structures 402 having a grid pattern of radial members 404 and circumferential members 406 forming a plurality of tank sections 408 to encapsulate a reactor core 410 in a substantially cylindrical shape. In this example, however, the reflector structure 402 includes a first circumferential end 412 and a second circumferential end 414. Each circumferential end 412, 414 is formed as a curved surface that corresponds to a curved surface of an adjacent reflector structure. By forming the reflector structures 402 with curved ends, a straight line seam between the reflector structures is removed so that there is not a straight line exit path for neutrons to follow. This further reduces parasitic loss of neutrons from the reactor core 410 during operation.

Figure 5A:
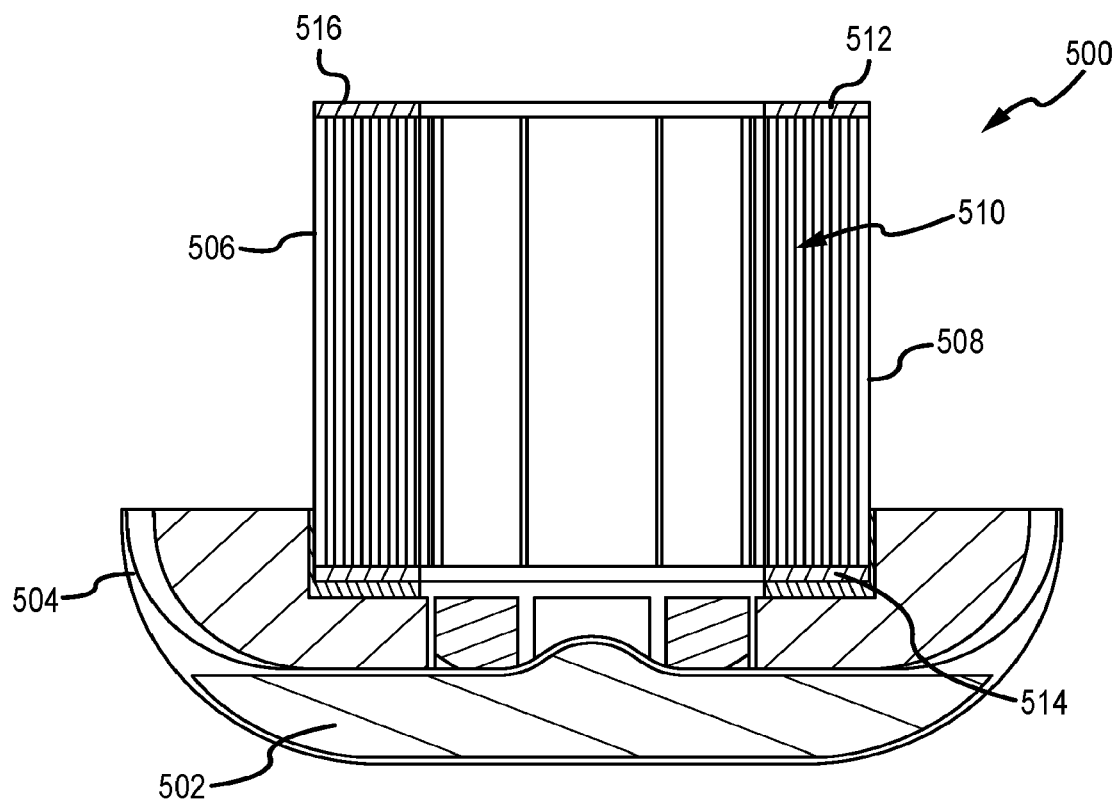
FIG. 5A is a partial longitudinal cross-sectional view of another reflector assembly.
Figure 5B:
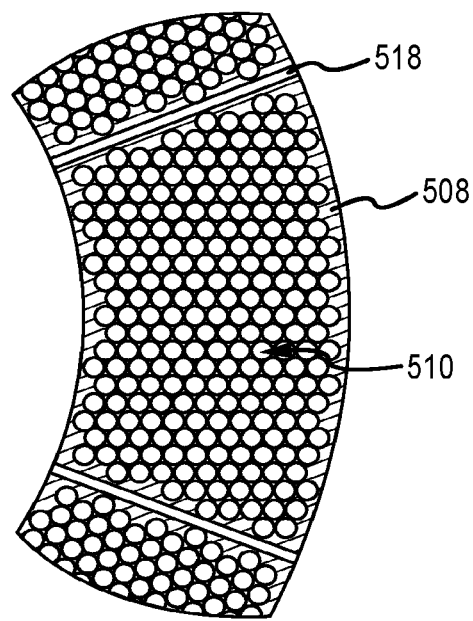
FIG. 5B is a partial axial cross-sectional view of the reflector assembly shown in FIG. 5A.

FIG. 5A is a partial longitudinal cross-sectional view of another reflector assembly 500. FIG. 5B is a partial axial cross-sectional view of the reflector assembly 500. Referring concurrently to FIGS. 5A and 5B, certain components of the reflector assembly are described above and, as such, are not described further. As described above, the reflector assembly 500 includes a lower reflector 502 disposed within a flow guide 504, a central reflector 506 including a plurality of reflector structures 508 circumferentially arranged about a longitudinal axis, and an upper reflector that is not shown for clarity. In this example, however, the reflector structures 508 are fabricated from monolithic blocks of tungsten or tungsten carbide and defined within the blocks are a plurality of tank sections 510 that are configured to hold at least one reflector material within the reflector structure 508. Each tank section 510 may selectively contain a reflector material, a fuel salt, or a void space to configure the energy spectrum reflection of the reflector assembly 500 for any fuel cycle operation as required or desired and as described above.

The tank sections 510 may be substantially circular in cross-section with wall sections that separate each tank section being as thin as 1 mm. In other examples, the tank sections 510 may have any other cross-sectional profile as required or desired (e.g., hexagonal). Additionally, a support structure 512 is illustrated with a base plate 514, a top plate 516, and a plurality of circumferentially spaced ribs 518 that extend between the plates 514, 516. The support structure 512 provides support for each of the tank sections 510 and enables the central reflector 506 to be lifted from the containment vessel for maintenance and/or replacement.

Figure 6:
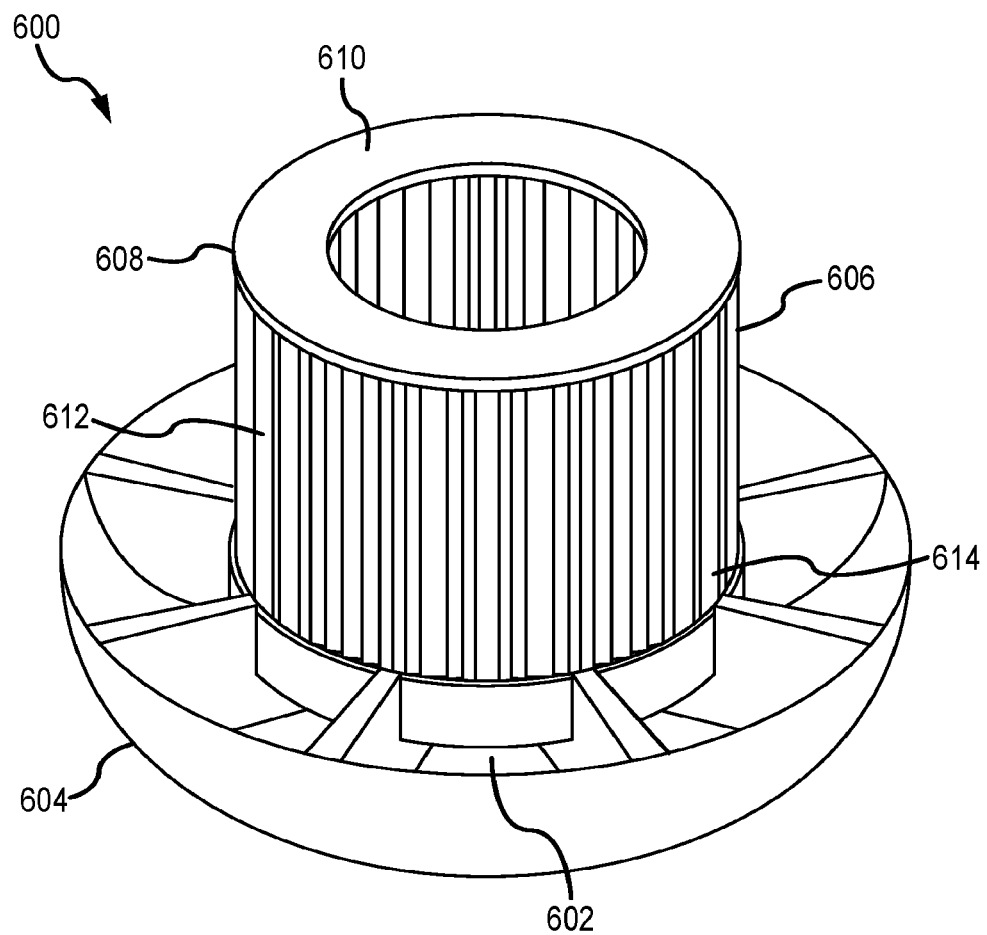
FIG. 6 is a partial perspective view of another reflector assembly.

FIG. 6 is a partial perspective view of another reflector assembly 600. Certain components of the reflector assembly are described above and, as such, are not described further. As described above, the reflector assembly 600 includes a lower reflector 602 disposed within a flow guide 604, a central reflector 606 circumferentially arranged about a longitudinal axis, and an upper reflector that is not shown for clarity. In this example, however, the central reflector 606 is formed by a support structure 608 including a base plate (not shown), a top plate 610, and a plurality of circumferentially spaced ribs 612. A plurality of tube members 614 are disposed within the support structure 608 between the base plate and the top plate 610. The tube members 614 extend along the longitudinal axis and are substantially parallel to the ribs 612.

In this example, the tube members 614 form the tank sections and are configured to hold at least one reflector material within the central reflector 606. Each tube member 614 may selectively contain a reflector material, a fuel salt, or a void space to configure the energy spectrum reflection of the reflector assembly 600 for any fuel cycle operation as required or desired and as described above. The tube members 614 may be packed such that adjacent tube members 614 are abutted to each other at tangency locations so as to increase the packing fraction and reduce the interstitial space between the tube members 614. The packing fraction is defined as the amount of reflector material relative to the tube member walls and the interstitial space. In one example, the tube members 614 all are similarly sized and shaped and may have approximately 1 mm thick walls and an approximately 100 mm diameter. In other examples, the tube members 614 may have any other shape and/or size as required or desired, including different sizes and/or shapes. For example, the tube members may be formed as hexagonal ducts so as to further increase the packing fraction.

Figure 7B:
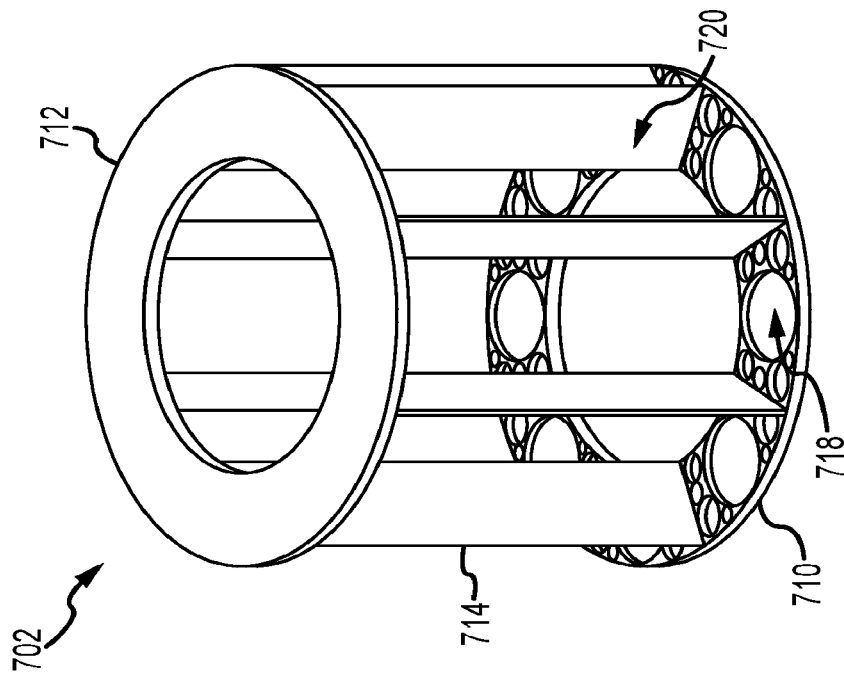
FIG. 7B is a perspective view of a support structure for use with the reflector assembly shown in FIG. 7A.
Figure 7A:
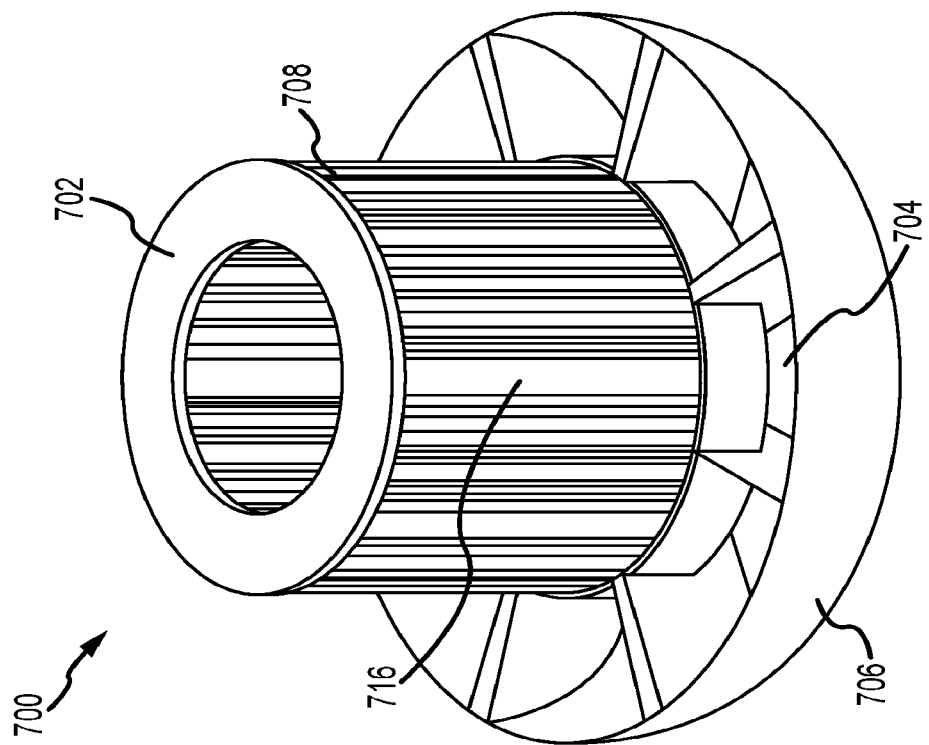
FIG. 7A is a partial perspective view of another reflector assembly.
Figure 7D:
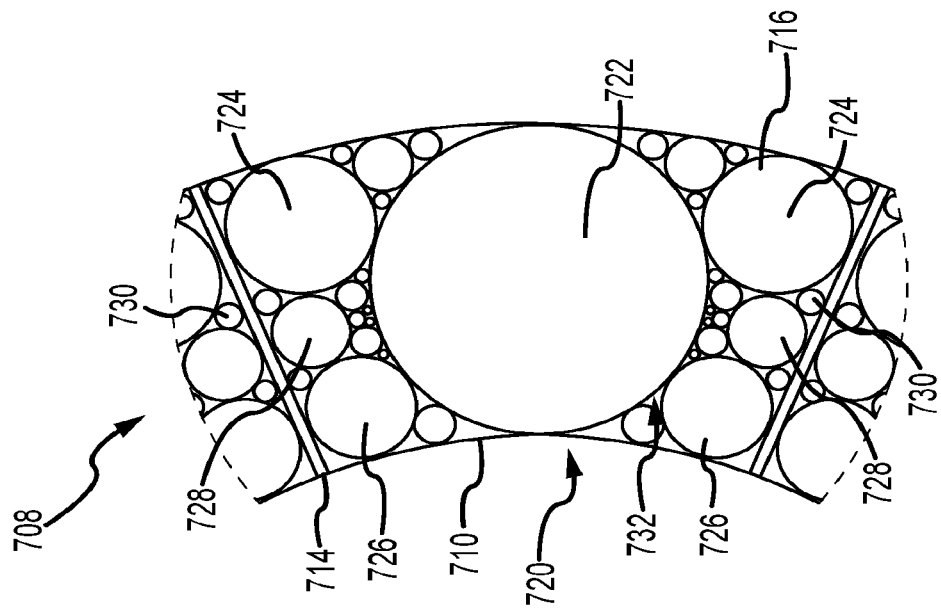
FIG. 7D is a partial enlarged cross-section view of the reflector assembly shown in FIG. 7C.
Figure 7C:
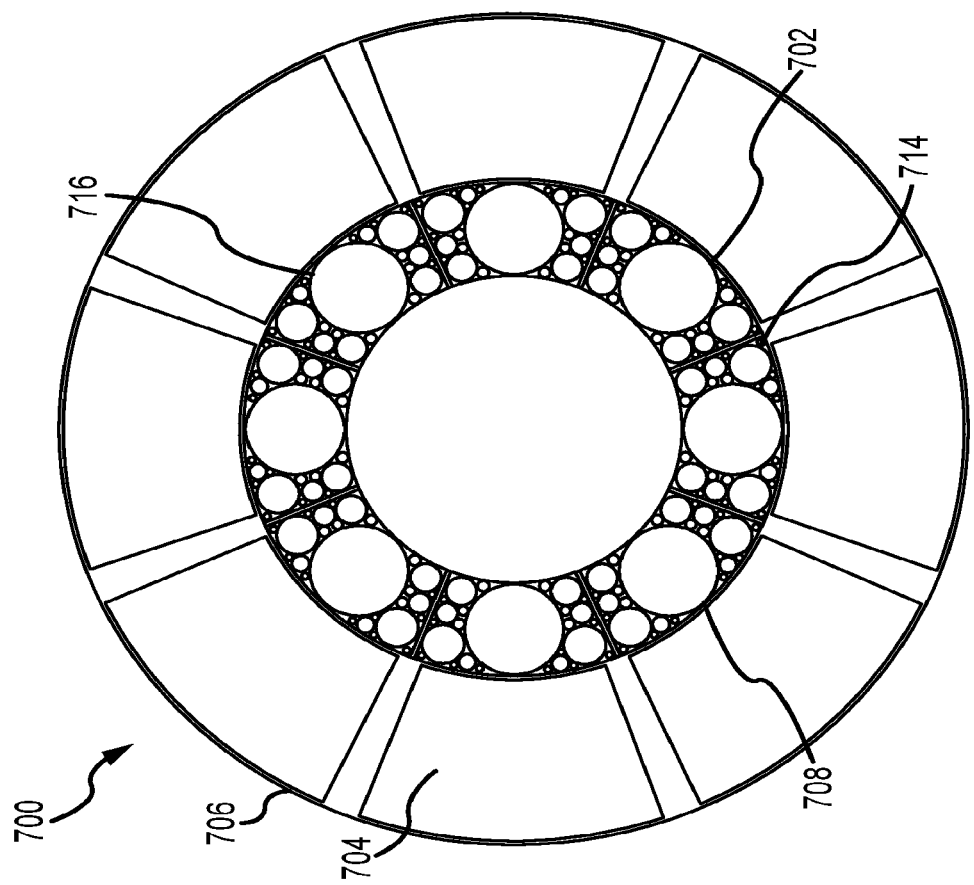
FIG. 7C is an axial cross-sectional view of the reflector assembly shown in FIG. 7A.

FIG. 7A is a partial perspective view of another reflector assembly 700. FIG. 7B is a perspective view of a support structure 702 for use with the reflector assembly 700. FIG. 7C is an axial cross-sectional view of the reflector assembly 700. FIG. 7D is a partial enlarged cross-section view of the reflector assembly 700. Referring concurrently to FIGS. 7A-7D, certain components of the reflector assembly are described above and, as such, are not described further. As described above, the reflector assembly 700 includes a lower reflector 704 disposed within a flow guide 706, a central reflector 708 circumferentially arranged about a longitudinal axis, and an upper reflector that is not shown for clarity. The central reflector 708 is formed by the support structure 702 that includes a base plate 710, a top plate 712, and a plurality of circumferentially spaced ribs 714. A plurality of tube members 716 are disposed within the support structure 702 forming the tank sections and configured to hold at least one reflector material within the central reflector 708. In this example, however, two or more of the tube members 716 have different diameters.

The tube members 716 extend between and supported by the base plate 710 and the top plate 712 while substantially parallel to the ribs 714. That is, the tube members 716 are connected at the top and bottom of the support structure so as to support the reflector material contained therein. For example, each tube member 716 may include a cap at each end for connecting to the support structure 702. The base and/or top plates 710 may include a plurality of recesses 718 that correspond to each tube member 716 so that the tube members are supported therein. By using the support structure 702, the central reflector 708 may be easily removed from the containment vessel and replaced at scheduled intervals. In some examples, the tube members 716 may be in flow communication with a reflector material circuit (not shown) to receive the reflector material as required or desired and as described above. The ribs 714 divide the support structure 702 into 8 sectors 720, each with the same volume. The tube members 716 are arranged in each sector 720 such that the packing pattern of the tube members 716 are repeated in every sector 720 and as illustrated in FIG. 7C. The tube members 716 are bundled together within the support structure 702 such that welds are not required to hold the tube members together.

For example, the tube members 716 may be manufactured with Alloy 617. Additionally, a first tube 722 having a radius of approximately 296 mm with a wall thickness of 4 mm is positioned at the center of the sector 720. A second tube 724 is positioned radially outward of the first tube 722 and has a radius of approximately 132 mm with a wall thickness of 2 mm. A third tube 726 is positioned radially inward of the first tube 722 and has a radius of approximately 98 mm with a wall thickness of 1.5 mm. A fourth tube 728 is positioned between the second tube 724 and the third tube 726 and has a radius of approximately 70 mm with a wall thickness of 1 mm. A number of other tubes 730 that have radii of between 7 mm and 53 mm with a wall thickness of 1 mm are packed between tubes 722, 724, 726, and 728. As such all the tube members are abutted to each other and to the ribs 714 at tangency locations. The space between the tube members defines an interstitial space 732.

This configuration forms a packing fraction, defined as the amount of reflector material relative to the tube member walls and the interstitial space, as greater than, or equal to, 80%. More specifically, the packing fraction is greater than, or equal to, approximately 87%. This enables for large quantities of reflector material, while reducing wall thicknesses to between 1 mm and 4 mm. Furthermore, circular shapes facilitated the thinnest structural walls in order to reduce parasitic loss due to the capture of neutrons. However, wall thicknesses may be between 1 mm and 100 mm as required or desired. In alternative examples, any other packing configuration of the tube members (e.g., a configuration of tube members having radii larger and/or smaller than described above) may be used that enables the central reflector 708 to function as described herein. For example, configurations may form a packing fraction that is greater than, or equal to, 60%, a packing fraction that is greater than, or equal to 70%, or a packing fraction that is greater than, or equal to 75% as required or desired.

The interstitial space 732 may be configured to form a void having no material or hold a fuel such a fuel salt or a coolant salt. For example, since the central reflector 708 forms the reactor core, components of the reflector will absorb heat and will need to be cooled. As such, the base plate 710 may include one or more orifices so that a portion of the fuel salt flow is channeled through the central reflector 708, via one or more of the interstitial spaces 732, and then exit through an orifice in the top plate 712 and rejoin the main flow at the exit channel located above the central reflector 708. This system increases criticality of the reactor, and thus, overall performance by providing addition fission neutrons in the reactor core. Additionally, the fuel salt generates its own hydrostatic pressure within the central reflector 708 and counteracts a portion of the reflector material hydrostatic forces within the tube members 716. In other examples, the interstitial space 732 may be configured to receive another coolant salt flow from the primary cooling circuit or a separate cooling circuit so as to remove heat from the central reflector 708. As such, the reflector assembly 700 may at least be partially cooled by the fluid in the interstitial space 732. In further examples, one or more of the tube members 716 may be configured to channel fuel salt or another coolant salt therethrough as required or desired. Both the fuel salt and the reflector material (e.g., liquid lead) are corrosive, and thus, require metal cladding or a corrosion inhibitor to protect against corrosion as described above.

As described above, depending on the fuel cycle operation of the reactor core, each of the tube members 716 may contain a similar reflector material (e.g., liquid lead for a fast spectrum burn and/or graphite for a thermal spectrum burn). While during reflector operation, some or all of the tube members 716 may be changed out so as to contain a different reflector material. This enables the energy spectrum reflection of the reflector assembly to be specifically modified to a fuel cycle operation as required or desired. As described above, the reflector material may be changed or replace via a reflector material circuit.

In other examples, one or more of the tube members may be formed from solid and/or liquid material and removed and replaced from the support structure. For example and in any of the examples described herein, the reflector material may include, but is not limited to, multitube liquid lead, liquid lead, lead, lead oxides (PbO), lead sulfides (PbS), stainless steel (e.g. SS316, SS309, SS3310, etc.), tungsten, tungsten carbides, desalloy, zirconium silicides ($ZrSi_2$, $Zr_3Si_2$, etc.), zirconium sulfides ($ZrS_2$), zirconium oxides ($ZrO_2$), depleted uranium, HT-9, magnesium oxides (MgO), silicon carbides (SiC), ferrous sulfides (FeS), barium oxides (BaO), and alkaline earth lead compounds ($Ba_2Pb$, $Sr_2Pb$, etc.).

Figure 8:
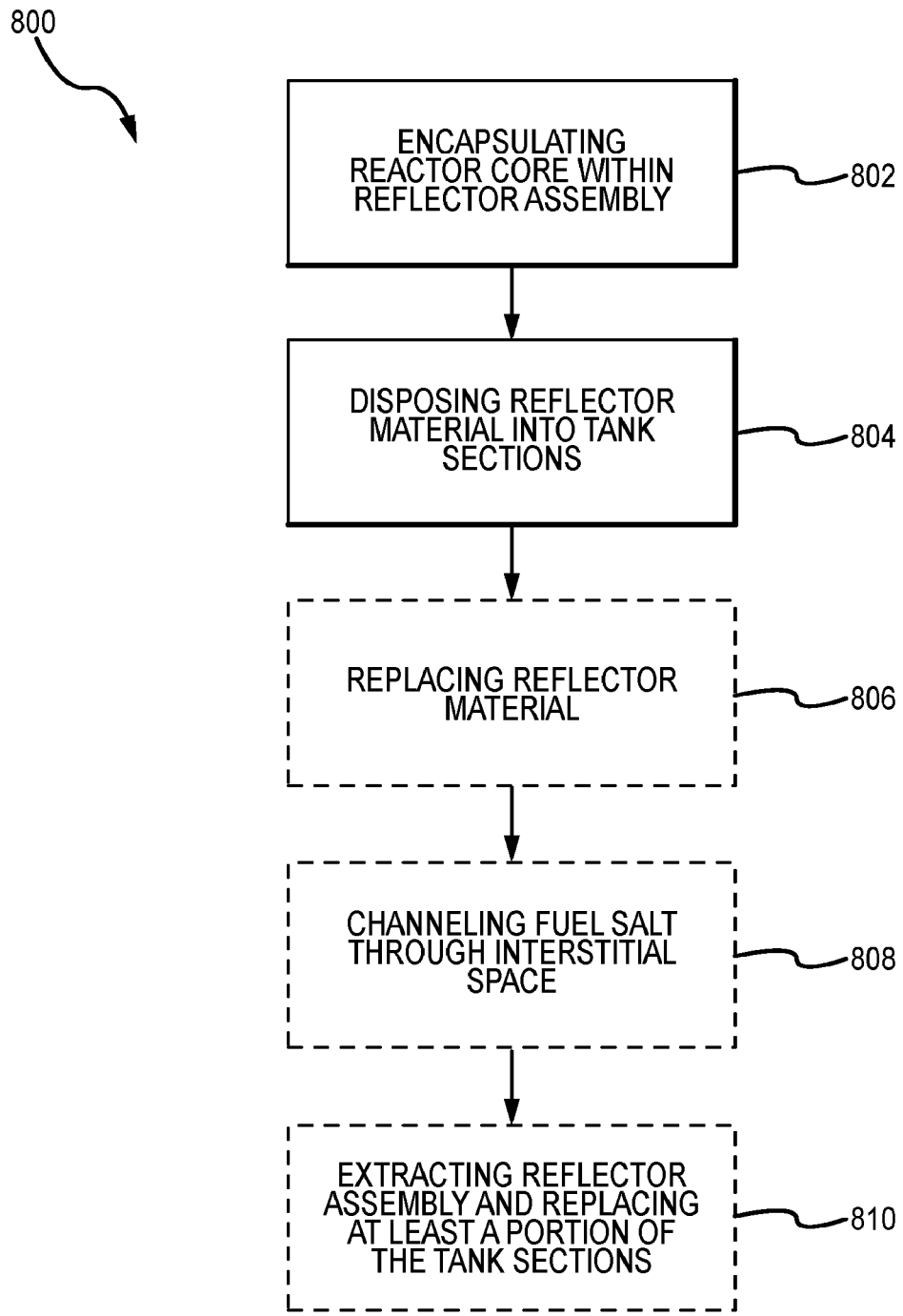
FIG. 8 illustrates a flowchart of an exemplary method of reflecting fission born neutrons back to a center of a reactor core.

FIG. 8 illustrates a flowchart of an exemplary method 800 of reflecting fission born neutrons back to a center of a reactor core containing high temperature nuclear fuel. To begin, the reactor core is encapsulated within a reflector assembly (operation 802). For example, the reflector assembly includes a plurality of tank sections that are circumferentially arrangeable in a substantially cylindrical shape such that the reactor core is located within. At least one reflector material is then disposed into the plurality of tank sections (operation 804). In some examples, during operation of the reactor core at least a portion of the first reflector material is replaced by a second reflector material (operation 806). For example, the first reflector material may be liquid lead so as to enable a fast spectrum operation and the second reflector material may be graphite so as to enable a thermal spectrum operation later in the reactor life-cycle.

In other examples, the plurality of tank sections may include a plurality of tube members disposed within a support structure and during operation of the reactor core a fuel salt is channeled through an interstitial space defined between the plurality of tube members (operation 808) for cooling the reflector assembly. In another example, the plurality of tank sections are supported by a support structure and the method further includes extracting the reflector assembly from the reactor core via the support structure and replacing at least a portion of the plurality of tank sections (operation 810).

In addition to those described above, further examples are disclosed in the following numbered clauses:

1. A reflector assembly for a molten chloride fast reactor (MCFR) comprising:
a support structure comprising a substantially cylindrical base plate, a substantially cylindrical top plate, and a plurality of circumferentially spaced ribs extending between the base plate and the top plate, wherein the support structure is configured to encapsulate a reactor core for containing nuclear fuel; and
a plurality of tube members disposed within the support structure and extending axially between the top plate and the bottom plate, wherein the plurality of tube members are configured to hold at least one reflector material to reflect fission born neutrons back to a center of the reactor core.

2. The reflector assembly of clause 1 or any clause that depends from clause 1, wherein each tube member of the plurality of tube members comprises a substantially similar diameter.

3. The reflector assembly of clause 1 or any clause that depends from clause 1, wherein the plurality of tube members comprises two or more tube members having different diameters.

4. The reflector assembly of clause 3 or any clause that depends from clause 3, wherein each tube member of the plurality of tube members are disposed within the support structure so that adjacent tube members are abutted to each other at a tangency location.

5. The reflector assembly of clause 3 or any clause that depends from clause 3, wherein the plurality of tube members comprises two or more tube members having different wall thicknesses.

6. The reflector assembly of clause 3 or any clause that depends from clause 3, wherein an interstitial space is defined between the plurality of tube members, and wherein a packing fraction of the at least one reflector material relative to the plurality of tube members and the interstitial space is greater than, or equal to, 70%.

7. The reflector assembly of clause 6 or any clause that depends from clause 6, wherein the packing fraction is greater than, or equal to, approximately 87%.

8. The reflector assembly of clause 6 or any clause that depends from clause 6, wherein the interstitial space is configured to hold fuel salt or coolant fluid.

9. The reflector assembly of clause 6 or any clause that depends from clause 6, wherein the interstitial space is devoid of material.

10. The reflector assembly of clause 1 or any clause that depends from clause 1, wherein the plurality of tube members are packed within the support structure and devoid of welds.

11. The reflector assembly of clause 1 or any clause that depends from clause 1, wherein the plurality of tube members are formed from Alloy 617.

12. The reflector assembly of clause 1 or any clause that depends from clause 1, wherein the plurality of tube members are clad in at least one of niobium, molybdenum, or ceramic substrate.

13. The reflector assembly of clause 1 or any clause that depends from clause 1, wherein the at least one reflector material comprises liquid lead and/or graphite.

14. A reflector assembly for a MCFR comprising:
at least one reflector structure, wherein the at least one reflector structure is circumferentially arrangeable in a substantially cylindrical shape that encapsulates a reactor core for containing nuclear fuel; and
one or more tank sections disposed within the at least one reflector structure, wherein the one or more tank sections are configured to hold at least one reflector material to reflect fission born neutrons back to a center of the reactor core.

15. The reflector assembly of clause 14 or any clause that depends from clause 14, wherein the at least one reflector structure forms a single tank section of the one or more tank sections.

16. The reflector assembly of clause 14 or any clause that depends from clause 14, wherein the at least one reflector structure defines a longitudinal axis, and wherein the at least one reflector structure comprises two or more tank sections of the one or more tanks sections, each of the two of more tank sections axially aligned along the longitudinal axis.

17. The reflector assembly of clause 16, wherein each of the two or more tanks sections are formed by individual and separable reflector structures.

18. The reflector assembly of clause 14 or any clause that depends from clause 14, wherein the one or more tank sections are formed by a grid pattern of a plurality of radial members and a plurality of circumferential members, each disposed within the at least one reflector structure.

19. The reflector assembly of clause 18, wherein the at least one reflector structure comprises two circumferential ends, and wherein the two circumferential ends comprise curved surfaces.

20. The reflector assembly of clause 14 or any clause that depends from clause 14, wherein the at least one reflector structure is monolithically formed with the one or more tank sections defined therein.

21. The reflector assembly of clause 14 or any clause that depends from clause 14, further comprising a support structure that holds the at least one reflector structure in the substantially cylindrical shape.

22. A method of reflecting fission born neutrons back to a center of a reactor core containing high temperature nuclear fuel, the method comprising:
encapsulating the reactor core within a reflector assembly, the reflector assembly including a plurality of tank sections circumferentially arrangeable in a substantially cylindrical shape such that the reactor core is located therein; and
disposing at least one reflector material into the plurality of tank sections.

23. The method of clause 22 or any clause that depends from clause 22, wherein the at least one reflector material is a first reflector material, the method further comprising replacing at least a portion of the first reflector material with a second reflector material.

24. The method of clause 23, wherein the first reflector material is liquid lead and the second reflector material is graphite.

25. The method of clause 22 or any clause that depends from clause 22, wherein the plurality of tank sections include a plurality of tube members disposed within a support structure, the method further comprising channeling a fuel salt through an interstitial space that is defined between the plurality of tube members.

26. The method of clause 22 or any clause that depends from clause 22, wherein the plurality of tank sections is supported by a support structure, the method further comprising extracting the reflector assembly from the reactor core via the support structure and replacing at least a portion of the plurality of tank sections.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A reflector assembly for a molten fuel nuclear reactor comprising:
a central reflector disposed circumferentially around a longitudinal axis to at least partially encapsulate a reactor core in a substantially cylindrical shape, wherein the central reflector includes one or more reflector structures holding reflector material configured to reflect fission born neutrons back to a center of the reactor core; and
a flow guide having a lower reflector defining a bottom of the reactor core,
wherein the flow guide supports the central reflector such that the central reflector is disposed vertically above and is spaced apart from the lower reflector,
the flow guide defines a plurality of flow channels formed between the lower reflector and the central reflector,
wherein the plurality of flow channels are configured to receive a fuel salt in a flow that circulates from an outer circumferential side of the central reflector, through the plurality of flow channels into an inner circumferential side of the central reflector, and through the reactor core.

2. The reflector assembly of claim 1, wherein the lower reflector is encapsulated within the flow guide.

3. The reflector assembly of claim 1, wherein the flow guide at least partially extends above a bottom end of the one or more reflector structures.

4. The reflector assembly of claim 1, wherein the flow guide includes a plurality of radially extending walls that define each of the plurality of flow channels.

5. The reflector assembly of claim 4, wherein the one or more reflector structures include a plurality of reflector structures that are circumferentially spaced around the longitudinal axis.

6. The reflector assembly of claim 1, wherein the one or more reflector structures include a plurality of reflector structures that are circumferentially spaced around the longitudinal axis, and each of the plurality of reflector structures are disposed above a respective flow channel of the plurality of flow channels.

7. The reflector assembly of claim 1, wherein the one or more reflector structures include a plurality of reflector structures individual and separable from one another.

8. The reflector assembly of claim 1, wherein the central reflector further includes a support structure configured to hold the one or more reflector structures around the reactor core in a substantially cylindrical shape.

9. The reflector assembly of claim 8, wherein the support structure includes substantially cylindrical top and bottom plates with a plurality of ribs extending therebetween, a portion of the plurality of ribs extends above the substantially cylindrical top plate and two ribs of the plurality of ribs at least partially form another flow channel above the one or more reflector structures.

10. The reflector assembly of claim 8, wherein the support structure includes substantially cylindrical top and bottom plates with a plurality of ribs extending therebetween.

11. The reflector assembly of claim 10, wherein a portion of the plurality of ribs extends above the substantially cylindrical top plate and two ribs of the plurality of ribs at least partially form an exit flow channel from the reactor core.

12. The reflector assembly of claim 11, wherein the exit flow channel is axially aligned with a respective entry flow channel of the plurality of flow channels along the longitudinal axis.

13. The reflector assembly of claim 1, wherein the one or more reflector structures include a plurality of reflector structures, at least two of the plurality of reflector structures have different reflector material.

14. The reflector assembly of claim 1, wherein the one or more reflector structures include a plurality of reflector structures, each of the plurality of reflector structures are circumferentially spaced around the reactor core.

15. The reflector assembly of claim 1, wherein the one or more reflector structures include a plurality of reflector structures, at least two of the plurality of reflector structures are axially stacked along the longitudinal axis.

16. The reflector assembly of claim 1, wherein the reflector material includes lead or graphite.

* * * * *